United States Patent
Klobucar et al.

(10) Patent No.: US 6,623,551 B2
(45) Date of Patent: Sep. 23, 2003

(54) BAFFLE SYSTEM FOR SEPARATING LIQUID FROM A GAS STREAM

(75) Inventors: Joseph M. Klobucar, Detroit, MI (US); James L. Pakkala, Livonia, MI (US); Guang Yu, Northville, MI (US); Gregory M. Still, Plymouth, MI (US)

(73) Assignee: Durr Industries, Inc., Plymouth, MI (US)

(*) Notice: Subject to any disclaimer, the term of this patent is extended or adjusted under 35 U.S.C. 154(b) by 0 days.

(21) Appl. No.: 10/040,737

(22) Filed: Jan. 7, 2002

(65) Prior Publication Data

US 2003/0046911 A1 Mar. 13, 2003

Related U.S. Application Data

(60) Provisional application No. 60/318,912, filed on Sep. 12, 2001.

(51) Int. Cl.[7] ............................................. B01D 45/08
(52) U.S. Cl. ...................... 96/356; 96/358; 96/360; 55/443; 55/465; 55/DIG. 46
(58) Field of Search .................. 55/440, 442–444, 55/462, 465, DIG. 46; 96/189–192, 197, 356, 358, 360

(56) References Cited

U.S. PATENT DOCUMENTS

| | | | |
|---|---|---|---|
| 752,194 A | * | 2/1904 | Baker |
| 808,897 A | * | 1/1906 | Carrier |
| 1,117,309 A | * | 11/1914 | Bentz |
| 1,147,484 A | * | 7/1915 | Cramer |
| 1,223,082 A | * | 4/1917 | Lissauer |
| 1,402,147 A | * | 1/1922 | Day |
| 2,474,540 A | * | 6/1949 | Marsh |
| 2,583,390 A | * | 1/1952 | Paasche |
| 2,655,905 A | * | 10/1953 | Rehm |
| 2,694,466 A | * | 11/1954 | Bingman |
| 2,976,954 A | * | 3/1961 | Irwin |
| 3,168,030 A | * | 2/1965 | Wilhelmsson et al. ......... 95/115 |
| 3,566,585 A | * | 3/1971 | Voloshen et al. .............. 55/435 |
| 3,813,855 A | * | 6/1974 | Hill et al. ...................... 55/440 |
| 3,813,856 A | * | 6/1974 | Jensen .......................... 55/444 |
| 3,870,494 A | * | 3/1975 | Doane .......................... 55/443 |
| 3,932,151 A | * | 1/1976 | Lau ........................... 55/465 X |
| 4,175,935 A | * | 11/1979 | Gutermuth et al. ........... 55/269 |
| 4,227,895 A | * | 10/1980 | Boon ........................... 55/226 |
| 4,257,784 A | * | 3/1981 | Gebhard et al. ................ 55/84 |
| 4,308,222 A | * | 12/1981 | Goettel et al. ............. 55/440 X |
| 4,430,101 A | * | 2/1984 | Sixsmith ...................... 55/440 |
| 4,484,513 A | * | 11/1984 | Napadow ............... 55/DIG. 46 |
| 4,557,740 A | * | 12/1985 | Smith .......................... 55/440 |
| 4,704,952 A | * | 11/1987 | Johnson et al. ............ 98/115.2 |
| 4,802,901 A | * | 2/1989 | Wurz et al. .................... 55/440 |
| 4,877,430 A | * | 10/1989 | Gutermuth ............... 55/440 X |
| 4,877,431 A | * | 10/1989 | Avondoglio .............. 55/443 X |
| 4,885,010 A | * | 12/1989 | Rich et al. .................... 55/241 |
| 4,927,437 A | * | 5/1990 | Richerson .................... 55/349 |
| 4,971,613 A | * | 11/1990 | Valliant ....................... 55/440 |
| 4,973,341 A | * | 11/1990 | Richerson .................... 55/127 |
| 5,020,470 A | * | 6/1991 | West et al. ............ 55/DIG. 46 |
| 5,100,442 A | * | 3/1992 | Gore et al. .................... 55/240 |
| 5,147,422 A | * | 9/1992 | Neeley et al. .................. 55/90 |
| 5,147,427 A | * | 9/1992 | Abbot et al. .............. 55/440 X |
| 5,342,422 A | * | 8/1994 | Wimbock .................... 55/444 |
| 5,352,257 A | * | 10/1994 | Powers ........................ 55/444 |
| 5,536,288 A | * | 7/1996 | Dewitt et al. ................. 55/440 |
| 6,228,154 B1 | | 5/2001 | Pakkala et al. ............... 96/323 |
| 6,290,742 B1 | | 9/2001 | Pakkala et al. ............... 55/443 |

* cited by examiner

Primary Examiner—Robert H. Spitzer
(74) Attorney, Agent, or Firm—Howard & Howard

(57) ABSTRACT

A baffle system for separating entrained liquid from a gas stream including columns of U-shaped baffles extending into a liquid trough and including flashing at the top of the baffles on opposed sides, wherein the wet side flashing is longer than the dry side flashing, and a trough baffle directing the air stream upwardly reducing re-entrainment of liquid. The flange portions of the columns of baffles are spaced to provide for cleaning.

49 Claims, 2 Drawing Sheets

BAFFLE SYSTEM FOR SEPARATING LIQUID FROM A GAS STREAM

RELATED APPLICATIONS

This application claims priority to provisional application Ser. No. 60/318,912 filed Sep. 12, 2001.

FIELD OF THE INVENTION

This invention relates to an improved baffle system for separating entrained liquids from a gas stream. The baffle system of this invention is particularly, but not exclusively suitable for removing contaminants from the air of a work area, such as a paint spray booth having a scrubber system.

BACKGROUND OF THE INVENTION

Baffle systems for separating liquid entrained in a gas stream have been used for many years. For example, baffle systems are conventionally used for separating water from an air stream in a paint application system. Paint overspray is removed from the paint application booth by downdraft air. The floor of the booth is flooded with water or water emulsion. The water and paint overspray are then received through scrubbers generally located in the floor below the paint application booth. The gas scrubber removes paint particles from the air in the paint booth, entraining the paint particles in the liquid. The air stream is then passed through baffles, removing the entrained liquid from the air stream.

A common form of baffle used by the automotive industry in paint application systems, for example, comprise at least two columns of U-shaped rectangular vertical baffles. The baffles each include a web portion and perpendicular flange portions, such that the web portions of the first column of baffles faces the direction of the air flow and the second column of baffles overlaps the baffles in the first column with the flanges extending toward the direction of air flow. The baffle system thus requires the gas stream to flow around the web portions of the first column of baffles into the rectangular U-shaped baffles of the second column of baffles and around the flange portions of the second column of baffles, depositing the liquid on the baffles which flows downwardly and out of the system. The particle size of the liquid droplets or particles is generally greater than about twenty microns ($20\mu$). In a conventional baffle system of this type, the width of the web portion is eight inches, the length of the flange portions are four inches and the flange portions overlap 0.25 inches. The average face velocity measured parallel to the duct in a baffle system for a paint application system of this type is generally between one hundred fifty to three hundred fifty feet per minute (fpm). The problems with this baffle system include re-entrainment and difficulty cleaning.

Various attempts have been made to improve the efficiency of baffle systems for removing entrained liquid from a gas stream. For example, the velocity of the gas stream through the baffle system may be increased by overlapping the ends of the flange portions, thereby improving the efficiency of the baffle system. However, a liquid having entrained paint particles will collect between the overlapping flanges requiring more frequent maintenance. It is also more difficult to clean between the overlapping flanges. More importantly, overlapping flanges provide no improvement in the re-entrainment performance of the baffles. Other proposed attempts to improve the efficiency of baffle systems for removing entrained liquid from a gas stream include complex baffle systems including, for example, spiral baffles, baffles having hook-shapes which further increase the velocity of the gas stream through the baffles to improve efficiency, etc. However, such complex baffle systems are relatively expensive to manufacture and require frequent maintenance particularly where a tacky substance, such as paint, is entrained in the liquid droplets or particles. Such complex baffle systems have not been found suitable for removing liquid entrained in a gas stream in a paint application system.

Thus, there remains a long-felt need for an improved baffle system which is relatively simple in construction, low in cost and having improved efficiency. Further, there is a need to reduce the maintenance costs of conventional baffle systems which reduces the collection of liquid and entrained tacky particles and which is easily cleaned, if necessary. As described below, the improved baffle system of this invention is relatively simple in construction, having reduced costs, particularly when compared to the complex baffle systems described above, and the baffle system of this invention has reduced maintenance costs when compared to baffle systems having overlapping elements.

This application discloses further improvements made to the baffle system of this invention which improves efficiency by reducing re-entrainment of liquid into the gas stream and improves cleaning of accumulation of contaminants on the baffle system during periodic cleaning of the baffle system of this invention.

SUMMARY OF THE INVENTION

As set forth above, the baffle system of this invention may be utilized in a paint spray booth wherein the water, air and paint overspray is received through a scrubber or scrubbers located in the floor beneath the paint spray booth. The scrubber removes the paint particles from the air in the paint spray booth and entrains the paint particles in the liquid. The liquid received from the scrubbers is then received in a tank or trough located below the scrubber as disclosed, for example, in U.S. Pat. Nos. 5,100,442 and 6,228,154 assigned to the assignee of the present application. The air is then received through a plurality of baffles where the entrained liquid and paint particles are removed. As will be understood, the efficiency of the baffle system in removing the liquid and entrained particles is critical to the efficiency of the overall system. The baffle system of this invention may also be utilized to separate entrained liquid from a gas stream in other applications.

The baffle system of this invention includes a first column of spaced aligned generally U-shaped baffle members each having a web portion and flange portions extending away from the direction of gas flow and a second column of spaced aligned generally U-shaped baffle members each having a web portion overlapping a web portion of the first column of baffle members and flange portions extending toward the web portions of the first column, such that the baffle members of each column overlap the adjacent column. The gas flowing through the columns of baffles is thus required to take a tortuous path between the baffles and deposits the liquid on the baffles. In the preferred embodiment, the baffles are suspended vertically and the liquid then flows down the baffles into a tank or trough for further processing. In the preferred embodiment of the baffle system, the flange portions extend generally perpendicular to the web portions from the opposed ends of the web portions and the web portions have a width at least three times the length of the flanges as disclosed in the above-referenced parent application.

The improvements to the baffle system disclosed in this application include (1) extending a portion of at least the first column of baffles into the tank or trough which receives the liquid, (2) providing flashing plates at the upper extent of the baffles in contact with the web portions of the coplanar baffle members, wherein the flashing plate on the first column at the upstream side of the baffle assembly has a greater vertical length than the flashing plate on the second column of baffles at the downstream side, (3) utilizing a vertical inlet baffle plate spaced upstream of the baffle members extending into the tank, wherein the upper end has a height of at least 30% of the effective height of the baffle members, and (4) spacing the flange portions of the baffle members of the first and second columns of baffle members a distance of 0.3 to 0.6 inches. As will be understood, these improvements may be utilized individually in the baffle system of this invention. However, it has been found that the greatest improvement in collection efficiency results from using these improvements in combination.

One problem addressed by the improved baffle system of this invention is "re-entrainment" of water droplets on the baffles. As set forth above, the purpose of a baffle system is to remove liquid droplets suspended in a gas stream. The gas stream containing the entrained liquid droplets is directed through the baffle array. The droplets accumulate on the baffles until a liquid film is formed. This liquid film then flows down under the influence of gravity. Ideally, this accumulated liquid flows to the bottom edge of the baffles and runs into a collection system which generally is a tank or trough. As used herein, the term "tank" is intended to cover any pool of liquid located beneath the baffle system, whether or not the tank includes an outlet and is thus technically a trough. As will be understood, re-entrainment of the liquid droplets or film into the air stream defeats the purpose of the baffle system and results in water droplets being re-entrained into the dry air stream which is conventionally vented to atmosphere. In a paint application booth, for example, this can result in increased maintenance requirements for the spray booth and possibly undesirable emissions. Further, where the entrained liquid includes contaminants, such as paint particles received in the wash water from a paint spray booth, the baffle system is subject to fouling by waste or oversprayed paint. Normally, the baffle system and the entire tank is cleaned by high pressure washing, generally semi-annually. This problem was partially solved by spacing the columns or arrays of baffles, such that the flange portions did not overlap. However, fouling still occurs on the inside surfaces of the flange portions of the baffles and it is difficult to clean these areas and there is no line of sight between the baffle members unless the baffles are spaced to confirm that the baffles are cleaned. However, spacing the columns of baffles reduces the overall efficiency of the baffle system, but the baffle system of this invention optimizes the spacing to permit cleaning without a significant loss of efficiency. As set forth above, the present invention addresses these problems to provide improved efficiency and cleanability.

In a conventional baffle system, the baffles are spaced above the liquid or water in the tank located below the scrubber generally a distance between one inch and one foot. Thus, the air stream can flow upwardly into the baffle system, reducing the overall efficiency of the system. It has now been found that the efficiency of the baffle system of this invention is improved by extending at least a portion of the "wet side" column of baffles into the tank below the level of the liquid in the tank. As used herein, the term "wet side" refers to the first column of baffles at the upstream side of the baffle system which initially receives the gas stream with the entrained liquid. The term "dry side" refers to the second column of baffles at the downstream side of the baffle system. Of course, where the baffle system includes three or more columns of baffles, the "dry side" of the baffle system will be the last column of baffles at the downstream side of the baffle system. Where a baffle plate is utilized to block the flow of air and entrained liquid upwardly into the baffle system, the plate preferably contacts the web portions of the first column of baffles at the wet side of the baffle system and extends into the collection tank below the level of water in the tank. In the preferred embodiment, however, the first column of baffles at the wet side extends into the liquid receiving tank, such that liquid flowing through the channels is received directly in the tank and the air cannot flow upwardly into the baffles. In the most preferred embodiment, the lower ends of both the first and second column of baffles extends into the tank below the liquid level providing the greatest improvement in efficiency.

Another improvement in efficiency provided by the baffle system of this invention is providing flashing at the top of the baffle system. The baffle array is normally suspended vertically by a bracket attached to the ceiling of the scrubber tank chamber located beneath the paint spray booth. Even in an ideal installation, water droplets collect on the lower surface of the bracket and the moisture then accumulates on the second column of baffles on the downstream or dry side of the baffle system, where the moisture is re-entrained in the airflow through the baffles. The baffle system of this invention prevents this moisture collected on the bracket from reaching the second column and thereby results in improved collection efficiency. The baffle system of this invention includes a flashing system comprising a flashing plate at both the dry and wet sides of the columns of baffle members at the top of the baffles, wherein the flashing on the wet side of the first column of baffle members has a greater vertical length than the flashing on the dry side. In the preferred embodiment, the vertical length of the flashing plate on the wet side or the first column of baffle members is at least three times the vertical length of the flashing plate on the dry side or preferably between three and 10 times the vertical length of the flashing plate on the dry side. Experimentation has established that the greatest efficiency is achieved by providing a flashing plate contacting the web portions of the first column of baffle members having a vertical length of between two inches to 12 inches, preferably between four and eight inches and most preferably about six inches. The flashing contacting the web portions on the second column of baffle members or dry side preferably has a vertical length between one-half inch and three inches. Although the improvement in efficiency provided by the flashing plates is not fully understood, experimentation has established that the greatest efficiency is provided by a flashing plate on the wet side of the first column of baffle members should have a length of about six inches and the flashing plate on the dry side should have a vertical length of at least one-half inch and may have a vertical length of up to about three inches. The lower edge of the dry side flashing plate may be straight or more preferably may include a plurality of angled edges, wherein moisture that collects on the lower edge of the dry side flashing plate runs off onto the baffles. In the most preferred embodiment, the lower angled edges of the dry side flashing plate include a plurality of relatively sharp edges formed by a vertical surface and an angled surface intersecting the vertical surface promoting runoff of the moisture collected on the bottom edge onto the baffles. The angled surface can be any angle which is not horizontal and a 45 degree angle has been found to work well.

It has also been found that a further improvement in liquid collection efficiency of a baffle system of the type disclosed herein is provided by directing the inlet air upwardly at a relatively sharp angle into the column of baffles. This is because the lower portions of the baffles have the greater volume of liquid, but the velocity of air flowing through the baffle system is greater in the lower portion in a conventional baffle system, resulting in re-entrainment of liquid in the gas stream. In the present invention, the air stream is directed upwardly by an inlet or trough baffle spaced from the first and second baffles having a lower end in the tank and an upper end including a flange portion extending toward the inlet stream as is known in the prior art. However, experimentation with the height of the inlet baffle has established that a significant improvement in efficiency can be achieved by raising the inlet or trough baffle to direct the incoming gas upwardly at a steeper angle. In a conventional baffle system, the dry side baffle column is attached to a floor section which forms the downstream side of the tank and which blocks the flow of gas through the bottom of the baffles. Thus, the "effective height" of the inlet or trough baffle is measured from the top of the floor section to which the dry side baffles are attached. In a baffle system having a vertical length of 6'6" or 78", the inlet baffle normally extends about 17" above the floor section to which the dry side baffles are attached or about 20% of the height of the baffles measured from the top of the floor section. However, experimentation has established that by extending the inlet baffle at least 30% or more preferably about 35% of the effective height of the baffles measured from the top of the floor section results in a significant improvement in the efficiency of the baffle system. Again, the reason for this significant improvement is not fully understood, but it is believed that the improvement results from directing the gas stream upwardly at a steeper angle into the baffle columns thereby reducing the velocity of the air stream in the lower portion of the baffles.

Finally, as set forth above, spacing the columns of baffles sufficiently to permit visualization and cleaning of the inside surfaces of the flange portions does not materially reduce the efficiency of the baffle system, provided the spacing is relatively small. In the preferred embodiment, the baffle system comprises a plurality of spaced generally U-shaped baffle members, wherein each baffle member includes a web portion and a flange portion extending generally perpendicular from the opposed sides of the web portion including a first column of baffle members having flange portions extending away from the direction of flow of the gas stream and a second adjacent column of baffle members each having a flange portion extending toward the web portions of the first column in overlapping relation. As set forth in the above-referenced parent application, it has been found that a significant improvement in efficiency results from dimensioning the baffle members wherein the width of the web portions of the baffle members is equal to or greater than three times the length of the flange portions and the flange portions of the columns of baffle members do not overlap. However, as set forth above, experimentation has now established that the flange portions of the adjacent columns may be spaced a distance of between 0.3 and 0.6 inches without a material loss of efficiency. This spacing, however, permits cleaning and visualization of the flange portions between the columns, thereby assuring complete cleaning of the baffle members and therefore improved efficiency.

Other advantages and meritorious features of the baffle system of this invention will be more fully understood from the following description of the preferred embodiments, the appended claims and the drawings, a brief description of which follows.

DESCRIPTION OF THE PREFERRED EMBODIMENTS

Figure 1:
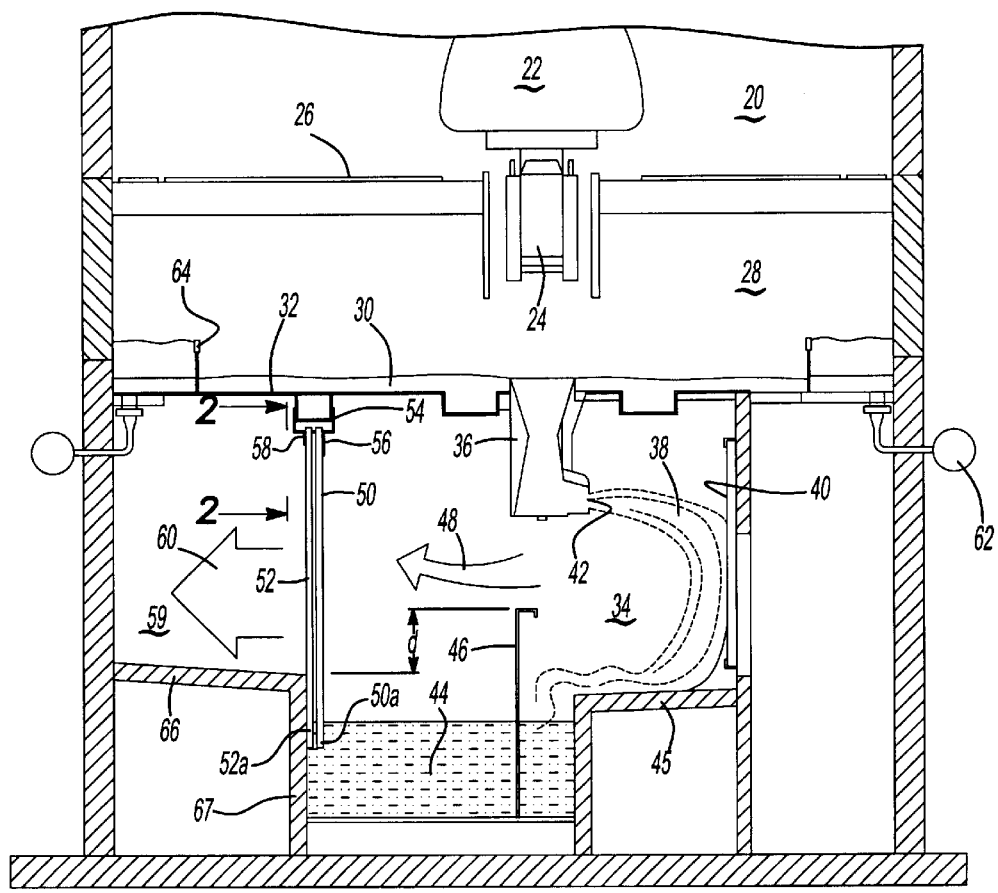
FIG. 1 is a partially schematic side partially cross-sectioned view of one embodiment of the baffle system of this invention.

FIG. 1 illustrates one embodiment of the baffle system of the invention in the environment of a paint spray booth. As set forth above, however, the baffle system of this invention may be utilized in any application to separate entrained liquid from a gas stream and is particularly suitable for separating an entrained liquid from a gas stream, wherein the liquid includes contaminants, such as paint overspray. The general configuration of the paint application booth assembly shown in FIG. 1 may be conventional including a paint application booth or paint booth 20 which receives the parts to be painted, such as the vehicle body 22, which are generally conveyed into the application booth 20 by a conveyor 24. Paint application equipment (not shown) are located on the floor 26 for application of paint to the vehicle 22. The water plenum 28 is located below the application booth 20 which receives water 30 generally including emulsifiers, detackifiers, etc. The floor 32 of the water plenum 28 directs the water and paint overspray to the scrubber or scrubbers 36 in the floor 32 of the water plenum 28, which also serves as the ceiling of the scrubber chamber 34. The scrubber 36 thoroughly mixes the air and water including airborne particles which are retained with the water 38 directed from the outlet 42 of the scrubber 36 against a wall 40 opposite the outlet 42 which removes the majority of the water and particles from the air. The water is then directed into a tank or trough 34 from the floor 45. The "wet air" is then directed upwardly by the trough or inlet baffle 46 into the baffles 50 and 52 as shown by arrow 48. The columns of baffles 50 and 52 are supported by a bracket 54. The dried air is then received in the outlet plenum 59 as shown by arrow 60 where it may be vented to atmosphere. The upper wall or back floor section 66 of the plenum 59 is generally inclined to return any moisture back to the tank 44. The lower end of the baffles 50 and 52 may be conventionally attached to the side wall 67 (not shown). In a conventional paint booth assembly, the water 30 is delivered from pumps (not shown) by piping 62 and flows onto the floor of the booth 32 over the weir 64.

As stated above, the booth assembly shown in FIG. 1 is generally conventionally. However, FIG. 1 also illustrates the improvements to the baffle system of this invention. These improvements will now be described. First, as shown in FIG. 1, the lower ends 50a and 52a of the baffles 50 and 52, respectively, extend into the tank 44 below the level of liquid in the tank. Previously, the baffles were attached to the vertical portion 67 of the bottom wall 66, but spaced above the liquid in the tank as described above. The improvement in efficiency of the baffle system resulting from extending the lower ends 50a and 52a into the tank 44 below the level of liquid in the tank is believed to result from two factors. First, it was found that moisture laden air could flow unobstructed upwardly through the baffles because the air can flow upwardly parallel to the baffles without obstruction. Thus, the velocity of the moisture laden air through this area can become great enough to re-entrain collected liquid running down the baffles. The liquid in the tank 44 thus serves to "plug" the lower ends of the baffles, preventing air from flowing upwardly through the baffles. Also, extending the baffles into the water promotes collection of water in the tank 44. As used herein, the term "efficiency" of the baffle system relates to the volume of water carried through the baffle system including re-entrained liquid. That is, the object of the baffle system is to separate and remove liquid entrained in the gas stream and to reduce or prevent re-entrainment of the liquid in the gas stream flowing through the baffle system. As set forth above, in a paint spray booth, the liquid is primarily water which contains paint overspray from the paint spray booth 20, but may also include other contaminants. Thus, the "efficiency" of the baffle system is determined by the moisture remaining in the air stream 60 after passing through the baffle system. The primary object of this invention is the reduce the moisture in the air stream 60 after passing through the baffle system. However, it has now been found that one source of moisture in the air stream 60 results from re-entrainment of the liquid from the baffle system. The collection efficiency of the baffle system of this invention was tested by first adding a dye to the water wash 30 and then placing cards at various locations in the baffle system, such as in the chamber 59. The entrained liquid then dyed the cards and the stain level of the cards after a predetermined time were tallied and compared for different baffle systems.

A second improvement resulted from the addition of the flashing plates 56 and 58 shown in FIG. 1 and the embodiments of the flashing plates shown in FIGS. 2–5 as now discussed. As shown in FIG. 1, the flashing system of the baffle system of this invention includes a flashing or flashing plate 56 on the wet side of the baffle system in contact with the wet side baffle members 50 and a flashing or flashing plate 58 on the dry side of the baffle system in contact with the wet side baffle members 52. In the preferred embodiment, the wet side flashing 56 has a vertical length of at least three times the vertical length of the dry side flashing 58 or preferably the vertical length of the wet side flashing 56 is between three and 10 times the vertical length of the dry side flashing 58. Experimentation and testing has established that the vertical length of the wet side flashing 56 is preferably between four and eight times the vertical length of the dry side flashing 58, most preferably about six times. The vertical length of the wet side flashing 56 is preferably at least two inches and may have a vertical length of up to about 12 inches. The reduction of liquid re-entrainment seems to diminish at vertical lengths greater than about six inches and therefore the most preferred vertical length of the wet side flashing plate 56 is between four and eight inches, most preferably about six inches. It has also been found that the dry side flashing 58 should have a vertical length of at least 0.5 inches and may have a vertical length up to about three inches. Greater vertical lengths for the dry side flashing 58 have not been tested.

Figure 2:
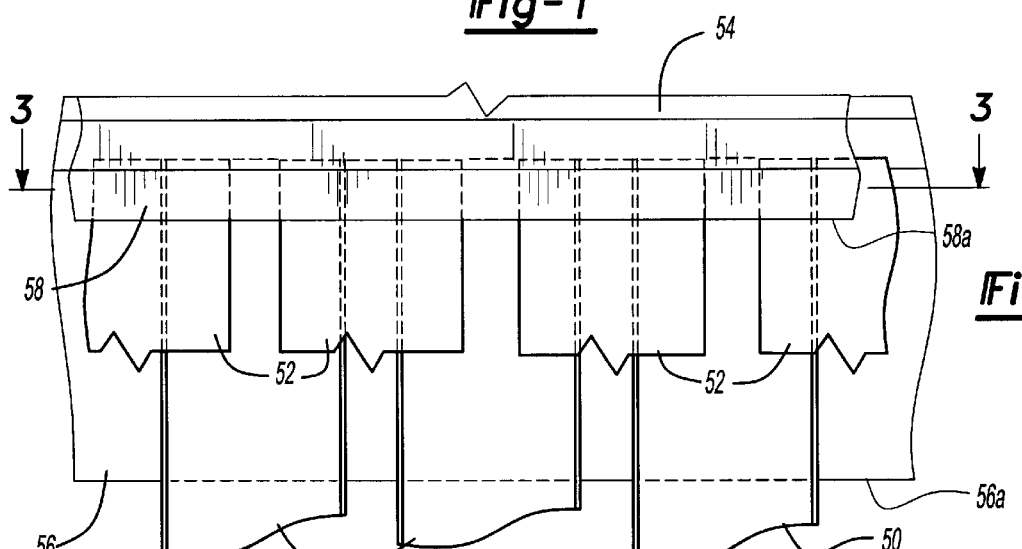
FIG. 2 is a partial side view of FIG. 1 in the direction of view arrows 2—2 illustrating one embodiment of the baffle system of this invention.
Figure 3:
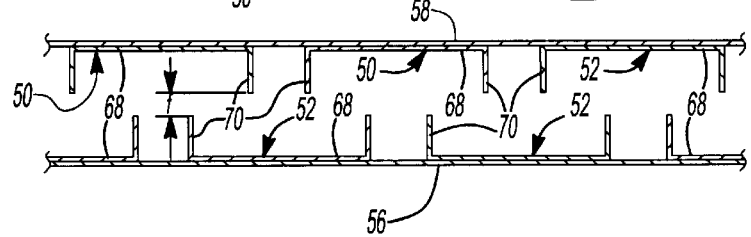
FIG. 3 is a top cross-sectional view of FIG. 2 in the direction of view arrows 3—3.

FIGS. 2 and 3 illustrate one embodiment of the baffle and flashing system of this invention. The baffles 50 and 52 of the first and second columns are preferably U-shaped each including a flat web portion 68 and flange portions 70 preferably extending perpendicular to the web portion from the opposed ends of the web portion 68. The flashing plates 56 and 58 contact the web portion 68 of the baffle members 50 and 52 as shown in FIG. 3. The preferred spacing between the flange portion 70 of the first and second column of baffle members 50 and 52 will be described below. The lower edges 56a and 58a of the flashing plates 56 and 58 may be linear and extend perpendicular to the longitudinal axes of the baffle members as shown in FIG. 2. The flashing plates 56 and 58 may be attached either to the web portions 68 of the baffle members or to the bracket 50 by any suitable means including fasteners, welding, etc.

The improvement in collection efficiency and reduction of re-entrainment provided by the flashing members 56 and 58 is not fully understood. However, it is believed that the flashing members 56 and 58 reduce moisture laden air from bypassing the baffle system above the baffles and cause moisture collecting on the flashing plates to flow down the baffles onto the web portions 68 of the baffle members 50 and 52.

Figure 7:
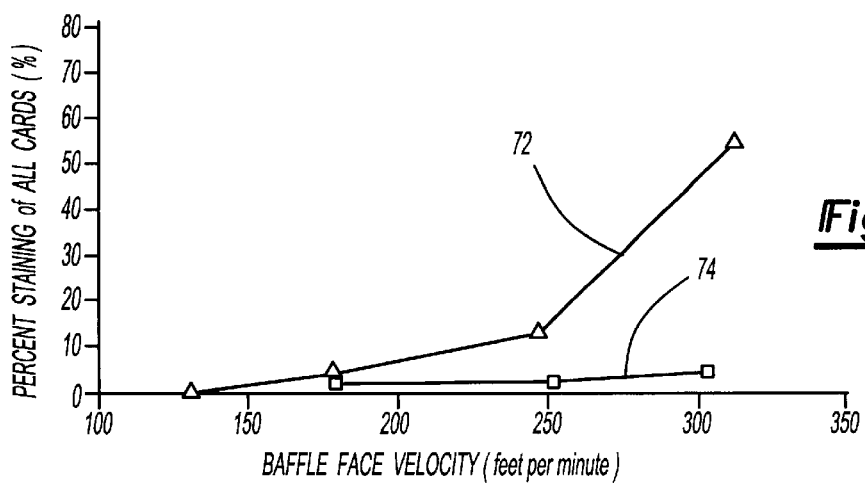
FIG. 7 is a graph summarizing one advantage of the baffle system of this invention.

The graph of FIG. 7 illustrates the advantage of the baffle system of this invention compared to the baffle system disclosed in the above identified parent application, now U.S. Pat. No. 6,290,742. As set forth above, the tests were conducted by adding a dye to the wash water 30 and placing cards at various locations in the chamber 59. The staining level of the cards after a predetermined period of time were then tallied and compared at different baffle face velocities. In FIG. 7, the percent staining of the cards in the chamber 59 with the baffle system disclosed in U.S. Pat. No. 6,290,742 is shown at 72 and the percent staining of the cards with the baffle system of this invention at 74. Thus, FIG. 7 shows a significant improvement in the baffle system of this invention.

Figure 4:
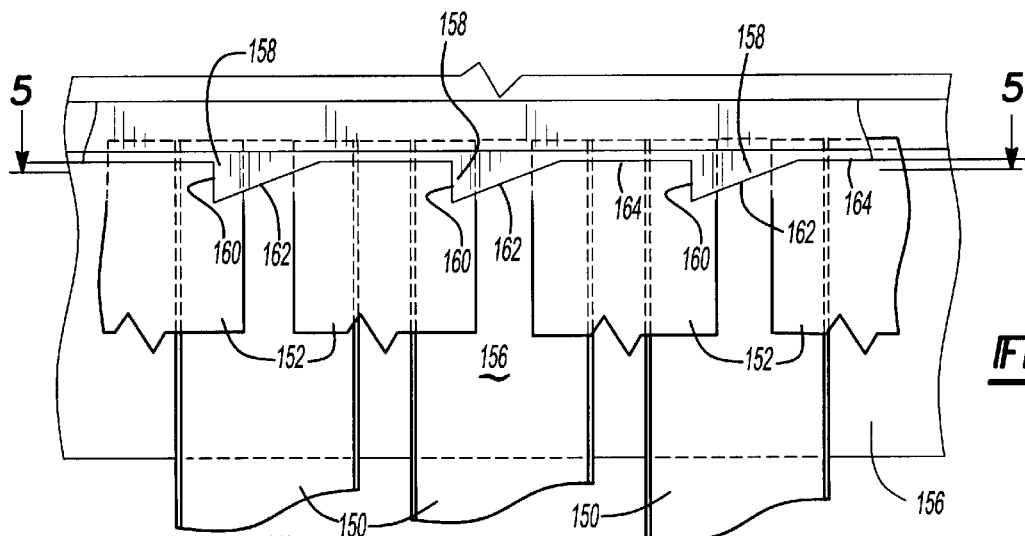
FIG. 4 is a side view similar to FIG. 2 illustrating an alternative embodiment of the baffle system shown in FIG. 2.
Figure 5:
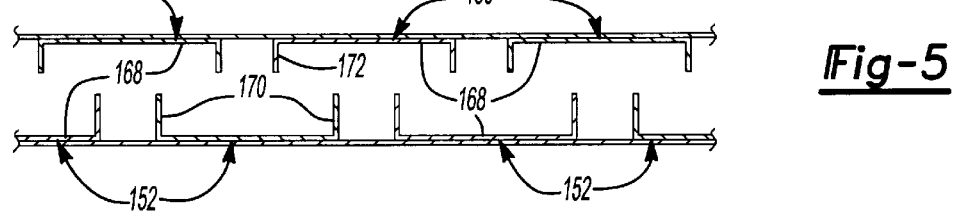
FIG. 5 is a top cross-sectional view similar to FIG. 3 illustrating an alternative embodiment of the baffle system shown in FIG. 3.

FIGS. 4 and 5 illustrate an alternative embodiment of the baffle system and flashing members shown in FIGS. 2 and 3. The dry side flashing plate 158 shown in FIG. 4 may be characterized as having a saw-tooth configuration engaging the web portions of the baffle members including vertical surfaces 160 engaging the web portion of the baffle members in the second column, angled surfaces 162 intersecting the vertical surface 160 and horizontal surfaces 164 between the "teeth." The angle of the angled surface 162 may be any appropriate angle that is not horizontal. However, a 45 degree angle has been found to work well. The purpose of the saw-tooth configuration at the lower edge of the dry side of the baffles is to allow any moisture which collects on the bottom edge of the dry side flashing 156 to run off on the web portions of the baffles engaged. The angled surface 162 span the adjacent baffles 152 and the vertical surface 160 contact the web portions 168 (FIG. 5) so that the liquid runs down to the adjacent baffles. From there, the water will run own to the collection trough or tank 44.

FIG. 5 also illustrates an alternative embodiment of the baffle members 50 and 52 shown in FIG. 2, wherein the baffle members 150 in the first column of baffles include flange portions 170 which are longer than the flange portions 172 of the second column or dry side baffles 152. As described above, the baffle members 150 and 152 are preferably U-shaped including a web portion 168 and flange portions 170 and 172 extending generally perpendicular to the web portions 168 at the opposed ends of the web portions 168. However, in this embodiment, the flange portions 170 at the wet side of the baffle system are longer than the flange portions 172 at the dry side. Although this configuration has not yet been tested, computer modeling has indicated that it may be advantageous in reducing re-entrainment of liquid on the baffle members. The flanges 172 may have a length ranging from 40% to 100% of the length of the baffles 170 as shown in FIG. 2.

Figure 6:
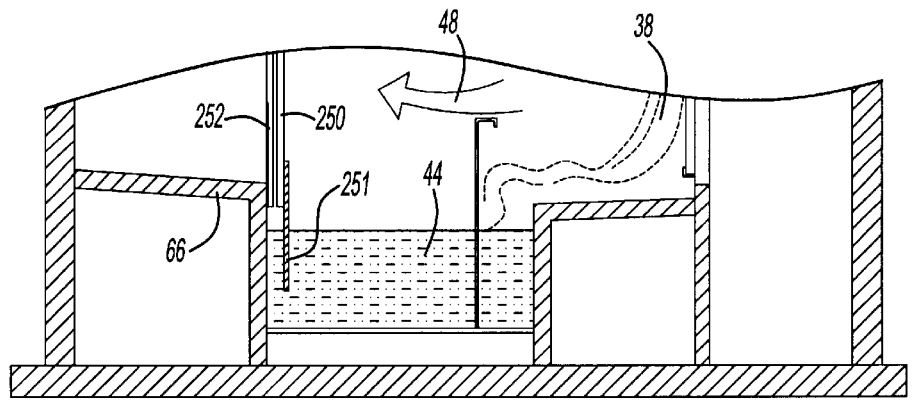
FIG. 6 is a partial schematic side cross-sectional view similar to FIG. 1 illustrating an alternative embodiment of the baffle system of this invention.

The third improvement of the baffle system of this invention relates to the height of the inlet or trough baffle 46. FIG. 6 illustrates an alternative embodiment of the baffle assembly, wherein the first column or wet side baffle members 250 of the first column of baffles includes a lower baffle plate or flashing 251 attached to the coplanar web portions of the first column of baffles and which extends into the tank or trough 44 beneath the level of the liquid in the tank 44. As set forth above, the advantage of extending the columns of baffle members 50 and 52 into the tank 44 below the level of liquid in the tank 44 is to block airflow upwardly from the bottom of the baffles, through the baffles. Because the air or gas can flow upwardly parallel to the baffles without obstruction, the velocity of the gas in this area can become high enough to re-entrain collected water running down from the upper portions of the baffles. Thus, the baffle plate 251 also blocks the upward flow of air through the baffles. If this alternative embodiment is utilized, it has been found advantageous to have the top edge of the baffle plate 251 extend about six inches above the lowest point of the back section floor 66 into the liquid in the tank 44. Both the embodiment shown in FIG. 1 and the embodiment shown in FIG. 6 thus serve to "plug" the bottom of the baffles, preventing unobstructed vertical airflow through the baffles and thus significantly reducing re-entrainment of liquid on the baffles.

The third improvement provided by the baffle system of this invention relates to the effective height of the inlet or trough baffle 46. As set forth above, the effective height of the trough baffle 46 is measured from the height of the back wall 67 which blocks the flow of air through the lower portion of the baffle system. This dimension is shown at "d" in FIG. 1. Conventional trough baffles of this type have an effective height of about 20% of the total length of the baffle columns 50 and 52, wherein the baffle members have a longitudinal length of about 6'6" or 78". The purpose of the trough baffle 46 is to deflect any high velocity air moving along the floor of the tank and prevent it from colliding with the bottom portions of the baffle system, causing a localized zone of high velocity. The high velocity zone at the bottom of the baffles has been found to contribute materially to re-entrainment because the volume of moisture draining along the baffles is greatest at the lower portions of the baffles. By increasing the effective height "d" of the trough baffle 46 to at least 30% or more preferably 35%, the velocity of the airflow at the lower portion of the baffles is reduced, thereby reducing re-entrainment of liquid flowing downwardly on the baffles where the volume of liquid is the greatest.

As set forth above, the several improvements to the baffle system described above reduce re-entrainment of liquid from the columns of baffles 50 and 52, thereby providing improved efficiency. However, the contaminants in the liquid removed from the gas stream collect on the inside surfaces of the flanges 70 in FIG. 3 and 170 and 172 in FIG. 5, particularly where these contaminants are tacky. As will be understood by those skilled in this art, various detackifying agents are generally included in the water stream of a spray booth to reduce the paint overspray particles from adhering to the scrubber 36, the walls of the scrubber chamber 34, the columns of baffles 50 and 52, etc. However, these surfaces must still be cleaned periodically as set forth above. As set forth in the above-referenced parent application, the flange portions of the baffle members in the prior art overlapped making it very difficult to clean the inside surfaces of the flange portions. Even where the flange portions do not overlap, however, the person cleaning the baffles cannot view the inside surfaces to determine whether the surfaces have been thoroughly cleaned. That is, there is no line of sight between the columns of baffles 50 and 52 where the flange portions are aligned as disclosed in the above-referenced parent application. This problem has been solved by the baffle system of this invention by spacing the flange portions 70 of the adjacent baffle members a distance "f" sufficient to provide a line of sight view of the inside surfaces of the flange portions 70 and facilitate cleaning without materially adversely affecting the collection efficiency of the baffle system. It has been found that the baffles may be spaced 0.3 to 0.6 inches without materially decreasing the collection efficiency of the baffle system while providing a line of sight between the baffles 50 and 52. Although the gap "f" between the adjacent flanges 70 may be one inch or more, testing has been conducted with a gap of one-half to three-eighths inches or between 0.3 and 0.6 inches without materially adversely affecting the collection efficiency of the baffle system. The preferred relationship between the web portion 68 and the flanges 70 in FIG. 3 or the web portions 168 and the flanges 170 and 172 in FIG. 5 remain as disclosed in the parent application. That is, in the preferred embodiment of the baffle system of this invention, the width of the web portions of the baffle members is at least equal to or greater than three times the length of the flange portions or more preferably at least four times the length of the flange portions. The width of the web portions is preferably about four inches or less. In the embodiment shown in FIG. 4, the web portions 168 may be as much as eight times the length of the flange portions 172. This relationship has provided an unexpected improvement in collection efficiency for the baffle system as discussed more fully in the above-referenced parent application.

Having described the preferred embodiments of the baffle system of this invention, it will be understood that various modifications may be made within the purview of the appended claims. For example, the several improvements to the baffle system of this invention may be utilized separately or individually, superior results in collection efficiency and reduction in re-entrainment of liquid is achieved by using the disclosed inventions in combination.

What is claimed is:

1. A baffle system for separating entrained liquid from a gas stream flowing through a scrubber, wherein said liquid is collected in a tank located below said scrubber with said tank containing said liquid at a generally predetermined level, said baffle system comprising: a first column of spaced aligned generally U-shaped baffle members each having a web portion and flange portions extending away from a direction of flow of said gas and a second column of spaced aligned generally U-shaped baffle members each having a web portion overlapping a web portion of said first column of baffle members and flange portions extending toward said web portions of said first column of baffle members, wherein said first column of baffle members includes a portion extending into said tank below said level of liquid in said tank.

2. The baffle system as defined in claim 1, wherein each of said baffle members of said first column of spaced aligned generally U-shaped baffle members extends into said tank below said level of liquid in said tank.

3. The baffle system as defined in claim 1, wherein all of said baffle members of said first and second column extend into said tank below said level of liquid in said tank.

4. The baffle system as defined in claim 1, wherein said baffle members of said first column include a plate attached to said web portions extending into said tank below said level of liquid in said tank.

5. The baffle system as defined in claim 1, wherein said baffle members extend generally vertically and said baffle members include a first vertical flashing plate at an upper end of said baffle members of said first column of baffle members blocking flow of gas at said upper end through said baffle members.

6. The baffle system as defined in claim 5, wherein said baffle system includes a second vertical flashing plate on a downstream side of said second column of baffle members having a vertical width less than said first vertical flashing plate.

7. The baffle system as defined in claim 6, wherein said first vertical flashing plate has a vertical length at least three times a vertical length of said second vertical flashing plate.

8. The baffle system as defined in claim 6, wherein said first vertical flashing plate has a vertical length of between two and twelve inches.

9. The baffle system as defined in claim 5, wherein said first vertical flashing plate includes relatively sharp edges along its lower extent.

10. The baffle system as defined in claim 1, wherein said baffle system includes a vertical inlet baffle plate spaced upstream of said baffle members extending into said tank having an upper end portion extending toward said direction of flow of gas, wherein said vertical inlet baffle plate has a height of at least 30% of an effective height of said baffle members, wherein said effective height of said baffle members is measured by a vertical length of said baffle members allowing said gas stream to flow unobstructed through said baffle members.

11. The baffle system as defined in claim 1, wherein said flange portions of said baffle members extend generally perpendicular to said web portions and said web portions have a width of at least twice the length of said flange portions, and said flange portions of said first and second column are spaced a distance of between 0.3 and 0.6 inches.

12. The baffle system as defined in claim 1, wherein said length of said flange portions of said baffle members of said first column are longer than the length of said flange portions of said second column.

13. The baffle system as defined in claim 12, wherein said flange portions of said baffle members of said first column of spaced aligned generally U-shaped baffle members have a length of at least three times a length of said flange portions of said second column.

14. A baffle system for separating entrained liquid from a gas stream flowing through a scrubber, wherein said liquid is collected in a tank located below said scrubber, said baffle system comprising: a first generally vertically extending column of spaced aligned generally U-shaped baffle members each having a web portion and flange portions extending away from a direction of flow of said gas and a second generally vertical column of spaced aligned generally U-shaped baffle members each having a web portion overlapping a web portion of said first column of baffle members and flange portions extending toward said web portions of said first column of baffle members, a first generally vertical flashing plate contacting an upper end of said web portions of said first column of baffle members and a second generally vertical flashing plate contacting an upper end of said second column of baffle members, wherein said first generally vertical flashing plate has a vertical length greater than said second generally vertical flashing plate.

15. The baffle system as defined in claim 14, wherein said vertical length of said first generally vertical flashing plate is at least three times said vertical length of said second flashing plate.

16. The baffle system as defined in claim 15, wherein said vertical length of said first generally vertical flashing plate is between two and 12 inches.

17. The baffle system as defined in claim 15, wherein said vertical length of said second generally vertical flashing plate is between 0.5 and 3 inches.

18. The baffle system as defined in claim 14, wherein said vertical length of said first generally vertical flashing plate is between three and 10 times said vertical length of said second generally vertical flashing plate.

19. The baffle system as defined in claim 14, wherein said second generally vertical flashing plate includes a lower edge having a plurality of pointed edges.

20. The baffle system as defined in claim 14, wherein said second generally vertical flashing plate includes a lower edge having a plurality of pointed edges formed by vertical edges and an angled edge intersecting said vertical edges forming said pointed edges.

21. The baffle system as defined in claim 14, wherein said first column of baffle members include a portion extending into said tank below a level of said liquid in said tank.

22. The baffle system as defined in claim 21, wherein each of said baffle members of said first column extends into said tank below said level of liquid in said tank.

23. The baffle system as defined in claim 21, wherein each of said baffle members of said first and second column of baffle members extends into said tank below said level of liquid in said tank.

24. The baffle system as defined in claim 14, wherein said baffle system includes a vertical inlet baffle plate spaced upstream of said first column of baffle members extending into said tank having an upper end extending toward said direction of flow of said gas, wherein said vertical inlet baffle plate has a height of at least 30% of an effective height of said baffle members, wherein said effect height of said baffle members is measured by a length of said baffle members where said gas stream flows unobstructed through said baffle members.

25. The baffle system as defined in claim 14, wherein said flange portions of said baffle members extend generally perpendicular to said web portions and said web portions have a width of at least three times a length of said flange portions, and said flange portions of said first and second columns of baffle members are spaced a distance of between 0.3 and 0.6 inches.

26. The baffle system as defined in claim 25, wherein said flange portions of said first column of baffle members are longer than said flange portions of said second column of baffle members.

27. The baffle system as defined in claim 14, wherein said flange portions of said baffle members extend generally perpendicular to said web portions and said web portions have a width of at least twice a length of said flange portions and said flange portions of said first and second columns of baffle members spaced a distance of about one-half inch.

28. A baffle system for separating entrained liquid from a gas stream, comprising: a plurality of generally coplanar columns, each column comprising a plurality of spaced generally upright U-shaped baffle members, each baffle member having a web portion and flange portions extending from opposite sides of said web portions each having a free end, including a first column of baffle members having said flange portions of said baffle members extending away from a direction of flow of said gas stream and a second adjacent column of said baffle members having web portions overlapping said first column of baffle members, wherein said web portions of each of said baffle members has a width which is equal to or greater than three times a length of said flange portions and said flange portions of said first and second column of baffle members are spaced a distance of between 0.3 and 0.6 inches.

29. The baffle system as defined in claim 28, wherein said first column of baffle members includes a portion extending into a tank containing a liquid maintained at a generally predetermined level in said tank and said portion of said first column of baffle members extending below said predetermined level of said liquid in said tank.

30. The baffle system as defined in claim 29, wherein said baffle members of said second column of baffle members extends into said tank below said predetermined level of said liquid in said tank.

31. The baffle system as defined in claim 29, wherein said baffle members of said first and second column of baffle members extending into said tank below said level of liquid.

32. The baffle system as defined in claim 28, wherein said baffle system includes a first generally vertical flashing plate contacting an upper end of said web portions of said first column of baffle members and a second generally vertical flashing plate contacting an upper end of said web portions of said second column of baffle members, wherein said first generally vertical flashing plate has a vertical length greater than a vertical length of said second vertical flashing plate.

33. The baffle system as defined in claim 32, wherein said vertical length of said first generally vertical flashing plate is at least three times said vertical length of said second generally vertical flashing plate.

34. The baffle system as defined in claim 33, wherein said vertical length of said first generally vertical flashing plate is between two and 12 inches.

35. The baffle system as defined in claim 32, wherein said vertical length of said second generally vertical flashing plate is between 0.5 and three inches.

36. The baffle system as defined in claim 35, wherein said vertical length of said first generally vertical flashing plate is between two and 12 inches.

37. The baffle system as defined in claim 32, wherein said second generally vertical flashing plate includes a lower edge having a plurality of relatively sharp edges pointing downwardly.

38. The baffle system as defined in claim 37, wherein said sharp edges are defined by a plurality of generally vertical edges and edges angled upwardly intersecting said generally vertical edges.

39. The baffle system as defined in claim 28, wherein said baffle system includes a generally vertical inlet baffle plate spaced upstream of said first column of baffle members extending into a tank receiving said liquid including an upper end extending toward said direction of flow of said gas stream, wherein said generally vertical inlet baffle plate has a height of at least 30% of an effective height of said baffle members, wherein said effective height of said baffle members is measured by a length of said baffle members where said gas stream flows unobstructed through said baffle members.

40. A baffle system for separating entrained liquid from a gas stream flowing through a scrubber, wherein said liquid is collected in a tank located below said scrubber, said baffle system comprising: a first vertical column of spaced aligned generally U-shaped baffle members each having a web portion and flange portions extending away from a direction of flow of said gas and a second vertical column of spaced aligned generally U-shaped baffle members each having a web portion overlapping a web portion of said first column of baffle members and flange portions extending toward said web portions of said first column of baffle members, and an inlet baffle spaced upstream of said direction of flow of said gas of said first column of baffle members having a lower end in said tank and an upper end having a height of at least thirty percent of an effective height of said columns of baffle members, wherein said effective height of said columns of baffle members is measured by a vertical length of said baffle members where said flow of said gas is unobstructed.

41. The baffle system as defined in claim 40, wherein said tank includes an outer wall downstream of said direction of flow of said gas and said baffle members extend into said tank below said outer wall, wherein said effective height of said columns of baffle members is measured between an upper surface of said outer wall and an upper surface of said columns of baffle members.

42. The baffle system as defined in claim 40, wherein said upper end of said inlet baffle has a height of at least 35% of said effective height of said columns of baffle members.

43. The baffle system as defined in claim 40, wherein said first column of baffle members includes a portion extending into said tank below a level of liquid in said tank.

44. The baffle system as defined in claim 40, wherein said first and second columns of baffle members extend into said tank below a level of liquid in said tank.

45. The baffle system as defined in claim 40, wherein said first column of baffle members includes a first flashing plate contacting said web portions at an upper end of said first column of baffle members and a second flashing plate contacting said web portions of the said baffle members of said second column of baffle members.

46. The baffle system as defined in claim 45, wherein said first flashing plate has a vertical height greater than a vertical height of said second flashing plate.

47. The baffle system as defined in claim 46, wherein said vertical height of said first flashing plate is at least three times said vertical height of said second flashing plate.

48. The baffle system as defined in claim 47, wherein said vertical height of said first flashing plate is between two and 12 inches.

49. The baffle system as defined in claim 40, wherein said flange portions of said first and second column of baffle members is spaced a distance of between 0.3 and 0.6 inches.

* * * * *